United States Patent [19]
Bratton et al.

[11] Patent Number: 6,074,972
[45] Date of Patent: Jun. 13, 2000

[54] ADSORBENT MATERIAL

[76] Inventors: Graham J Bratton, 154 Old Farm Avenue, Sidcup, Kent, United Kingdom, DA15 8AL; Karon D. Buck, Alancroft, Kingsfield Road, West Kingsdown, Kent, United Kingdom, TN15 6LH; Timothy Naylor, Englefield Green, Englefield Green, Sy, United Kingdom, TW2 0NQ

[21] Appl. No.: 08/875,814

[22] PCT Filed: Feb. 6, 1996

[86] PCT No.: PCT/GB96/00243

§ 371 Date: Aug. 5, 1997

§ 102(e) Date: Aug. 5, 1997

[87] PCT Pub. No.: WO96/24435

PCT Pub. Date: Aug. 15, 1996

[30] Foreign Application Priority Data

Feb. 6, 1995 [GB] United Kingdom .................. 95 02292

[51] Int. Cl.⁷ ...................................................... B01J 20/28
[52] U.S. Cl. .................................. 502/4; 502/60; 502/64; 62/480; 165/104.15
[58] Field of Search .......................... 62/480; 165/104.15; 502/4, 60, 64

[56] References Cited

U.S. PATENT DOCUMENTS

| 5,100,596 | 3/1992 | Haag et al. | 264/42 |
| 5,120,694 | 6/1992 | Dunne et al. | 502/68 |
| 5,258,339 | 11/1993 | Ma et al. | 502/4 |
| 5,362,522 | 11/1994 | Barri et al. | 427/435 |
| 5,429,743 | 7/1995 | Geus et al. | 210/490 |
| 5,456,093 | 10/1995 | Dunne et al. | 62/480 |

FOREIGN PATENT DOCUMENTS

| 0135069 | 3/1985 | European Pat. Off. . |
| 0488287 | 6/1992 | European Pat. Off. . |
| 2698098 | 5/1994 | France . |
| 3347700 | 7/1985 | Germany . |
| 4112358 | 10/1992 | Germany . |

*Primary Examiner*—Tom Dunn
*Attorney, Agent, or Firm*—Bartlett & Sherer; Ronald B. Sherer

[57] ABSTRACT

A material for use in sorption air-conditioning refrigeration or space conditioning units which comprise a metal mesh such as a foam on which are bound micro or mesoporous material such as zeolite crystals which is capable of adsorbing a working fluid such as water and in which void spaces are left between the material to allow for the adsorption of the working fluid. The material has improved heat transfer properties compared with existing materials.

6 Claims, 1 Drawing Sheet

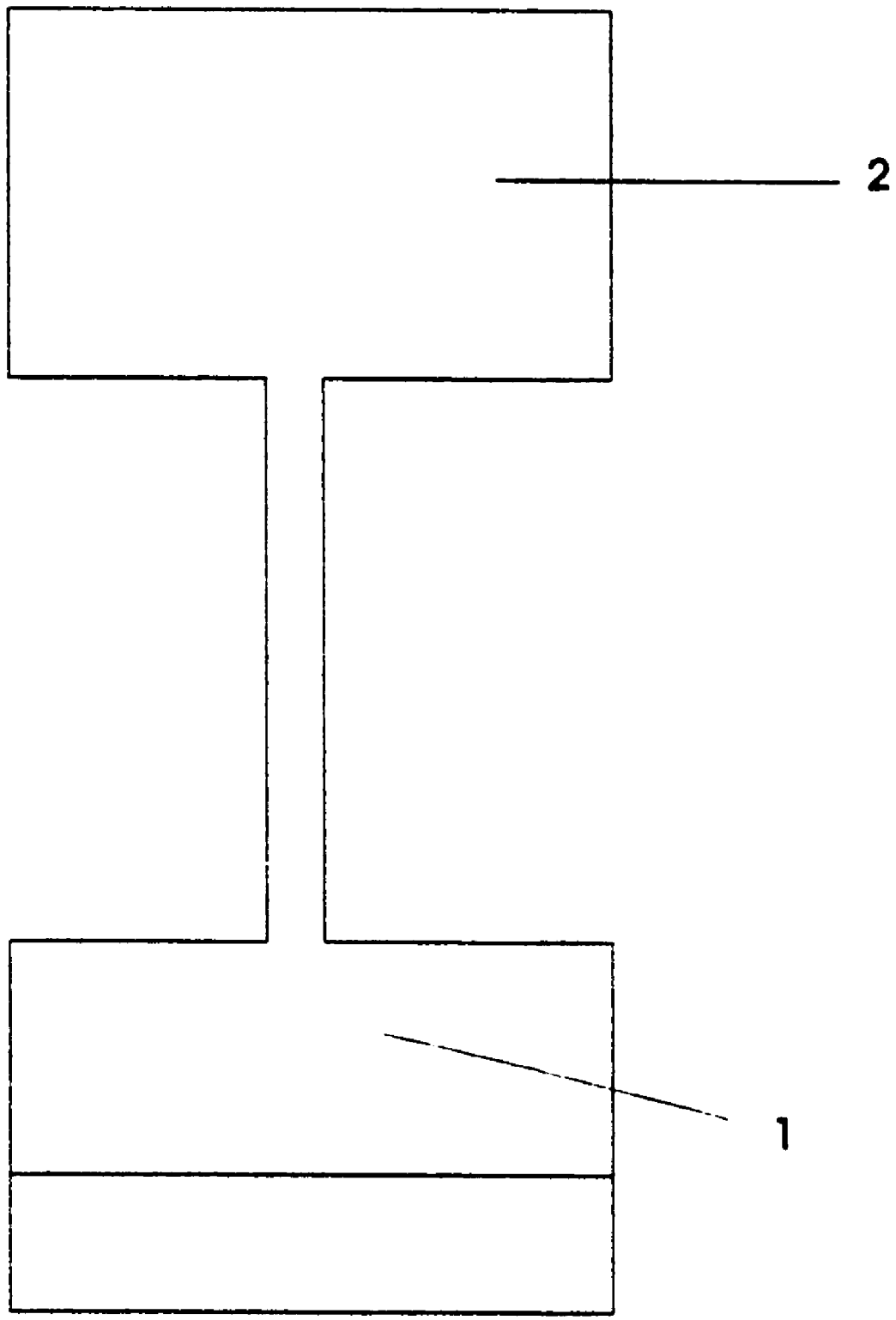

ADSORBENT MATERIAL

This application is a 371 of PCT/GB96/00243, filed Feb. 6, 1996 based on GB 95 02292.7, filed Feb. 6, 1995.

The present invention relates to a material which can be used as an adsorbent in a refrigeration or air-conditioning unit and to a method and equipment for refrigeration or air conditioning using this adsorbent.

Solid sorption systems have been described and used for cooling purposes in place of compression/evaporation systems and can have advantages in use. Sorption heat pumps are well known and are described in an article by B. Shelpuk in Heat Recovery Systems and CHP Vol. 13 No.4, 1993 Pages 321–328.

In some types of air-conditioning system, the extracted heat is released by the adsorption of the working fluid vapour onto a sorption material where its latent heat can be released to a heat sink.

Thus it is important that there is good heat transfer between the sorption material and the heat sink. This would normally require good heat transfer through the sorption material itself and good wall heat transfer to transfer this heat to the walls of the container so that it can be readily released to the heat sink, e.g. via fins or vanes to the surrounding air as highlighted in the article "Advances in Innovative Heat Exchangers" by Cacciola et al in Science technical Froid 1994 Pages 239–245.

A discussion of the use of solid sorption systems is given in the article by F. Meunier in "Heat Recovery Systems and CHP", Vol. 13, No. 4, pages 289–295, 1993. In this article, various types of solid sorption systems are commented on and it is pointed out that the first priority is the development in the heat transfer properties of the solid sorbent.

This problem is discussed in more detail in the article in "Heat Recovery Systems and CHP", Vol. 13, No.4, pages 297–300 by J. J. Guilleminot et al. In this article, the use of zeolites as the solid sorbent in solid sorption heat pumps is discussed and methods of increasing the thermal conductivity of these sorbents by the use of metal frames is disclosed.

A metal/zeolite composite is disclosed which is made by forming a paste of zeolite powder by suspension in a silico-aluminate gel and then filling a metal foam, e.g. a copper foam, with this paste. The paste filled metal foam is then compressed at some tens of MPa and heated at 1000° C. for three hours.

The composite formed is said to have improved thermal conductivity to that of granular or consolidated zeolites and an increased wall heat transfer coefficient which makes the material useful as heat pump adsorber packaging.

In such systems the zeolite is held in contact with the metal either with a binder or by other physical contact.

In addition it is important that there is good mass transfer between the working fluid and the adsorbent and that the working fluid has a low pressure drop through the adsorbent.

We have now devised a micro or mesoporous compound/metal material which is useful as a sorbent material in a refrigeration or air-conditioning system and which has improved properties.

According to the invention there is provided a material for use as an adsorbent in a sorption air-conditioning unit which material comprises a porous metal substrate on which is coated a micro or mesoporous inorganic material which can adsorb a working fluid and then desorb the working fluid by application of heat and in which material there are voids to allow at least partial penetration of the working fluid.

The invention also comprises a sorption air-conditioning unit in which a solid adsorbent comprises such a material.

By air-conditioning or refrigeration is meant the process in which the temperature of a space is reduced by the extraction of heat using a working fluid, which working fluid is then cooled and used again to extract heat from the space.

It can apply to space heating applications and to refrigerators where heat is extracted from an enclosed space.

The cooling of air can also cause water vapour in the air to condense and so act as a dehumidifying system.

Inorganic micro or mesoporous materials which can be used in the present invention include silicates, aluminates, titanates, siliceous materials such as pillared clays and the preferred inorganic micro or mesoporous materials are zeolites such as 4A, 5A, X, Y and 13X.

A preferred working fluid is water and in this case the inorganic micro or mesoporous material should readily adsorb water which can then be driven off easily by heating.

The inorganic mesoporous materials are preferably strongly directly bound to the metal substrate e.g. by deposition from solution.

When the adsorbent is a zeolite the zeolite crystals can be formed on the porous metal substrates by growing the crystals from a suitable solution. The zeolite crystals can be formed by impregnating a porous metal substrate with a zeolite synthesis gel under conditions where crystals of zeolite grow within the pores. The porous metal substrate can be in the form of a mesh, a cage-like structure, a sponge or foam, a grid of metal filaments, etc.

For more effective operation of the material as a sorbent, there should be sufficient passage ways between the inorganic micro or mesoporous material such as zeolite crystals formed on the metal substrate to enable the working fluid of the sorption heat exchanger to penetrate readily through the sorption material.

The size of the pores in the adsorbent of the present invention will to some extent depend on the working fluid to be used. The pores should be of sufficient size to allow the penetration of the working fluid through the pores and the thickness of inorganic micro or mesoporous material such as zeolite crystals on the metal substrate should be sufficient so that the volume of inorganic micro or mesoporous material such as zeolite is adequate to provide effective adsorption of an adequate amount of the working fluid. The metal substrate also should be of a thickness to provide a large surface area on which the inorganic micro or mesoporous material such as zeolite crystal can be bound for adsorption of the working fluid.

Thus for a metal substrate with a fine mesh, a thinner layer of inorganic micro or mesoporous material such as zeolite crystal should be used, so that the pore size is not too small, but this is counteracted to a certain extent by the fact that there will be a larger surface area of inorganic micro or mesoporous material such as zeolite crystal.

For metal substrates which have up to 90% by volume of voids without any micro or mesoporous material formed or deposited on them, the percentage of volume which is void space after the zeolite crystal is formed or deposited on the substrate is preferably from 5% to 85%, more preferably from 5% to 60% for example from 10 to 40%. However the pore size of the adsorpent should be sufficient to allow the penetration of the working fluid. In the case where water is the working fluid should have a permeability factor of at least $10^{-14}$ m$^2$ and more preferably at least $10^{-13}$ m$^2$ as measured in the Meunier reference referred to above and the pore size from 4 to 2000 Angstroms.

This method of forming a material for use as an adsorbent in air conditioning units differs from previously disclosed methods by the growth of micro or mesoporous materials on the metal substrate rather than relying on physical contact being caused by compression so it is chemically bound.

Methods for the formation of zeolite membranes have been widely disclosed; however, the end product of these methods is to form a coherent zeolite membrane—not one with passage ways through it.

The methods of forming the crystals previously disclosed can be used in the present invention provided that the zeolite deposition process is not allowed to continue until the pores in the substrate are all closed.

Preferably the methods of forming the crystals previously disclosed are those which give a good contact between the metal substrate and the zeolite crystals. In any case the zeolite deposition process should not be allowed to continue until the pores in the crystal are all closed. When sufficient of the zeolite crystals have been formed on the mesh the mesh is removed from the liquid from which the zeolite is deposited it is preferably washed to remove traces of this deposition liquid and dried and ready for use.

Methods of preparing supported zeolites, e.g. for use as catalysts, etc, are disclosed in U.S. Pat. No. 3,244,643, U.S. Pat. No. 3,730,910, U.S. Pat. No. 4,578,372, DE-A-3827049, EP 0481660 A1, EP 0481658 A1 and EP 0481659 A1.

In particular, EP 0481660 A1 gives a detailed account of methods of forming zeolite crystals on metal substrates and gels etc., which can be used and, although these methods are used for formation of membranes, the same process, etc. can be used to form the materials of the present invention by not allowing crystal formation to proceed until the pores in the substrate are closed.

The metal substrate is preferably made of aluminium, nickel, silver, gold or copper or other metal having good heat conducting properties and is in the form of a porous mesh, allowing easy passage of the fluid through it.

The material useful in the present invention e.g. a zeolite can be formed by immersing the mesh in a synthesis gel capable of crystalising to produce a crystalline zeo-type material and inducing crystallisation of the gel so that zeo-type material is deposited on the metal.

Suitable meshes that can be used are those sold under the Trade Name "Bekipor".

The void space can be measured by nitrogen adsorbtion and the pore size can be measured using the technique of bubble point pressure as defined in ISO4003 and pore size distribution may be measured by a Coulter Porometer (Trademark).

The metal can be pretreated as described in the above references to give a good metal/micro or mesoporous material bonding.

Sorbent material can be used with any working fluid which is strongly adsorbed by a micro or mesoporous material and water is a preferred fluid for ease of use and environmental reasons and has a high latent heat of evaporation.

In use the adsorpent of the present invention can be placed in a suitable container so that the working fluid can be passed over and through the material. The material can be in the form of a mesh or it can have channels through it e.g. in a regular array. Alternatively it can be in the form of sheets and the working fluid is passed over the sheets in parallel or sequentially so that the working fluid passes in a cross flow arrangement over the mesh. The configuration is not critical provided that, in use, the working fluid can readily come into contact with the zeolite crystals.

Refrigerators, air-conditioning systems, space conditioning systems using the adsorbents of the present invention can be of the conventional adsorption type and have the advantage of reduced size and increased effectiveness resulting from the use of the adsorbent materials of the present invention.

BRIEF DESCRIPTION OF THE DRAWINGS

It is a feature of the present invention that it enables a material to be produced which has a very high surface area of a micro or mesoporous material bonded to a substantially continuous metal substrate. This structure gives very good heat and mass transfer through its bulk and good heat transfer to the walls of a container, enabling the heat released by adsorption and condensation of the working fluid by the micro or mesoporous material to be effectively transmitted to an appropriate heat sink e.g. by radiation to the surrounding air by means of fins, vanes etc. This property enables adsorption cooling systems to be made smaller and enables this cooling method to be used in applications where it has not been possible before because of the bulk of the adsorbent material. With the use of water as a working fluid environmental problems associated with the use of the working fluids used in compression/ expansion systems are avoided.

The invention is described with reference to the following examples which describe the preparation of adsorbents according to the invention.

EXAMPLE 1

The substrate used was a Bekipor (Trade Mark) ST 60BL3 filter. This consists of very fine 316 stainless steel fibres brought together in a 3-dimensional labyrinthic structure. The fibres are arranged randomly in a homogeneous web. This web is further compacted and sintered to give a very strong metallic bond at each fibre crossing. The mean pore size is approximately 60 microns and the diameter of the wire on the surface is 6.5 microns. It had a porosity of 86% and an air permeability at 200 Pa of 1,100 L.min$^{-1}$ dm$^{-2}$ as measured by ISO 4022.

A 7 cm. disc of the metal mesh was placed in a 100 ml flat bottomed petri dish which had previously been cleaned by washing with de-ionised water, acetone, toluene and finally acetone before being dried in an oven at 90 degrees C. for 30 mins.

Two solutions A and B were prepared separately in two 500 ml glass bottles as follows:

Solution A 24.49 g Sodium Aluminate, 3.75 g Sodium Hydroxide and 179.74 g de-ionised water were mechanically shaken until dissolved. The Sodium Aluminate had an actual composition 62.48% $Al_2O_3$, 35.24% $Na_2O$, and 2.28% $H_2O$.

Solution B 50.57 g Sodium Silicate of composition 14.21% $Na_2O$, 35.59% $SiO_2$ and 50.20% $H_2O$ was dissolved in 179.74 g de-ionised water.

Solution A was added slowly to solution B with both stirring and shaking by hand to ensure complete and even mixing (it is important that no lumps of hydrogel are formed). This resulted in a hydrogel having nominal molar composition $$2.0\ Na_2O{:}Al_2O_3{:}2.0\ SiO_2{:}143\ H_2O$$

50 ml of the hydrogel was slowly poured into the petri dish containing the mesh. The petri dish was placed in a domestic pressure cooker together with a beaker containing the remaining hydrogel solution.

The pressure cooker was placed in an oven preheated to 90 degrees C. for 10 hours. Subsequently it was removed from the oven and allowed to cool for 30 minutes. The petri dish was removed and the solution poured away.

The metal mesh was carefully removed with a long flat rod ensuring that the mesh was not bent or damaged in any way. The mesh was placed in a glass beaker and washed three times with 100 ml aliquots of de-ionised water, swirling the solution each time to ensure complete removal of residues. The glass beaker was placed in an oven for three hours at 90 degrees C.

The surface of the dried coated mesh was subsequently wiped clean with a clean lens tissue in order to remove any loose powdery deposits which may have formed on the surface.

The mesh formed had a void space of 60% of the original mesh a permeability factor k of $20 \times 10^{-12}$ and was found to strongly adsorb water vapour from moist air with an increase in temperature. The water could be driven off by heating.

EXAMPLE 2

Using an identical substrate to that used in Example 1, prepared in the same way, NaA zeolite crystals were grown on the substrate using the following formulation.
Solution A 3.26 g Sodium Aluminate (with the same composition as used in Example 1) was dissolved in 167.2 g of deionised water.

Solution A was slowly added to Solution B as described in Example 1. This resulted in a clear solution having a nominal molar composition of

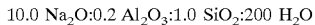

10.0 $Na_2O$:0.2 $Al_2O_3$:1.0 $SiO_2$:200 $H_2O$

The mesh as in example 1 was suspended vertically in a glass vessel to which the above solution was subsequently added. The glass vessel was sealed in a preheated pressure cooker in a preheated oven at 90° C. for 16 hours. The mesh was carefully removed, allowed to cool for 1 minute and washed and dried as in Example 1.

The mesh formed had an air permeability of 600 l.min$^{-1}$ dm$^{-2}$ at 200 Pa and was found to strongly adsorb water from moist air with an increase in temperature of the mesh. The water could be driven off by heating.

A schematic diagram of a cooling circuit incorporating the adsorbent material of the invention is illustrated in the drawing.

A space around a vessel (1) to be cooled is connected to a container (2) containing the adsorbent of the present invention. The working fluid is water vapour. In use the working fluid is adsorbed onto the adsorbent in container (2), this results in more water vapour evaporating from the container (1) which in turn results in the temperature or the water and of container (1) falling. The degree of cooling is determined by the amount of water evaporated from container (1) and which is adsorbed into the adsorbent in container (2). Regeneration of the adsorbent is achieved by heating container (2). This results in the adsorbed water being driven off the adsorbent and being re-adsorbed into the water in container (1).

To aid regeneration, heat in the form of electrical energy may be used, optionally by resistive heating of the metal mesh substrate.

It is a feature of the present invention is that the metal mesh substrate is used to aid conduction of this heat directly to the adsorbent.

What is claimed is:

1. A sorption material for use as an adsorbent in a sorption air conditioning or refrigeration unit which sorption material comprises a porous metal substrate in the form of a mesh, a cage structure, a sponge or foam or a grid of metal filaments on which is coated a micro or mesoporous zeolite material which adsorbs a working fluid and then desorbs the working fluid by application of heat, and in which sorption material there are sufficient passage ways between the zeolite crystals formed on the metal substrate to enable the working fluid of the sorption air conditioning unit to penetrate through the sorption material, and in which the zeolite crystals are formed on the porous metal substrate by growing the crystals from a solution or from a synthesis gel.

2. The material of claim 1 in which said metal filaments are selected from the group comprising aluminum, nickel, silver, gold or copper.

3. A material for use as an adsorbent in a sorption air-conditioning or refrigeration unit, said material consisting of a porous uncoated metal substrate on which is directly bonded a homogenous micro or mesoporous zeolite, said zeolite forming a three dimensional (3-D) crystalline structure within the pores of the metal substrate and wherein the zeolite substance can adsorb and desorb a working fluid with very little or no permeation therethrough by the application of heat, and in which sorption material there are void spaces comprising in the order of 10% to 40% by volume of the void space of the uncoated metal substrate.

4. A material as claimed in claim 3 in which said void spaces comprise from 55% to 65% by volume of the void space of the uncoated metal substrate.

5. A material as claimed in claim 3 which has a permeability factor k of at least $10^{-12}$ m$^{-2}$.

6. A refrigeration unit or an air conditioning unit which incorporates an adsorption unit as claimed in claim 3 and which uses water as a working fluid.

* * * * *